April 14, 1942.   M. G. CROSBY   2,279,660
WAVE LENGTH MODULATION SYSTEM
Filed Jan. 5, 1940   5 Sheets-Sheet 3

INVENTOR
MURRAY G. CROSBY
BY
ATTORNEY

April 14, 1942.   M. G. CROSBY   2,279,660
WAVE LENGTH MODULATION SYSTEM
Filed Jan. 5, 1940   5 Sheets-Sheet 4

Fig. 2a

INVENTOR
MURRAY G. CROSBY
BY
ATTORNEY

Fig.3

Patented Apr. 14, 1942

2,279,660

UNITED STATES PATENT OFFICE 2,279,660

WAVE LENGTH MODULATION SYSTEM

Murray G. Crosby, Riverhead, N. Y., assignor to Radio Corporation of America, a corporation of Delaware Application January 5, 1940, Serial No. 312,446

11 Claims. (Cl. 179—171.5)

This application concerns new and improved frequency modulators. Certain of the frequency modulators of this application concern the principles involved in my United States application Serial No. 136,578, filed April 13, 1937. In a frequency modulator of this application a feature disclosed in my United States application Serial No. 304,888, filed November 17, 1939, is used.

In describing my invention, reference will be made to the attached drawings wherein:

In Figure 3, which is a modification of Figure 1, a modified form of degenerative feedback means is disclosed, while;

In the modification illustrated in Figure 2, the automatic frequency control circuits of Figure 1 are not utilized, stabilizing being obtained by the use of balanced reactance tube modulators which, due to their novel arrangement, supply stabilizing potentials to the oscillation generator. The principle involved here in this modification is as disclosed in my United States application Serial No. 311,074, filed December 27, 1939.

Figure 1:
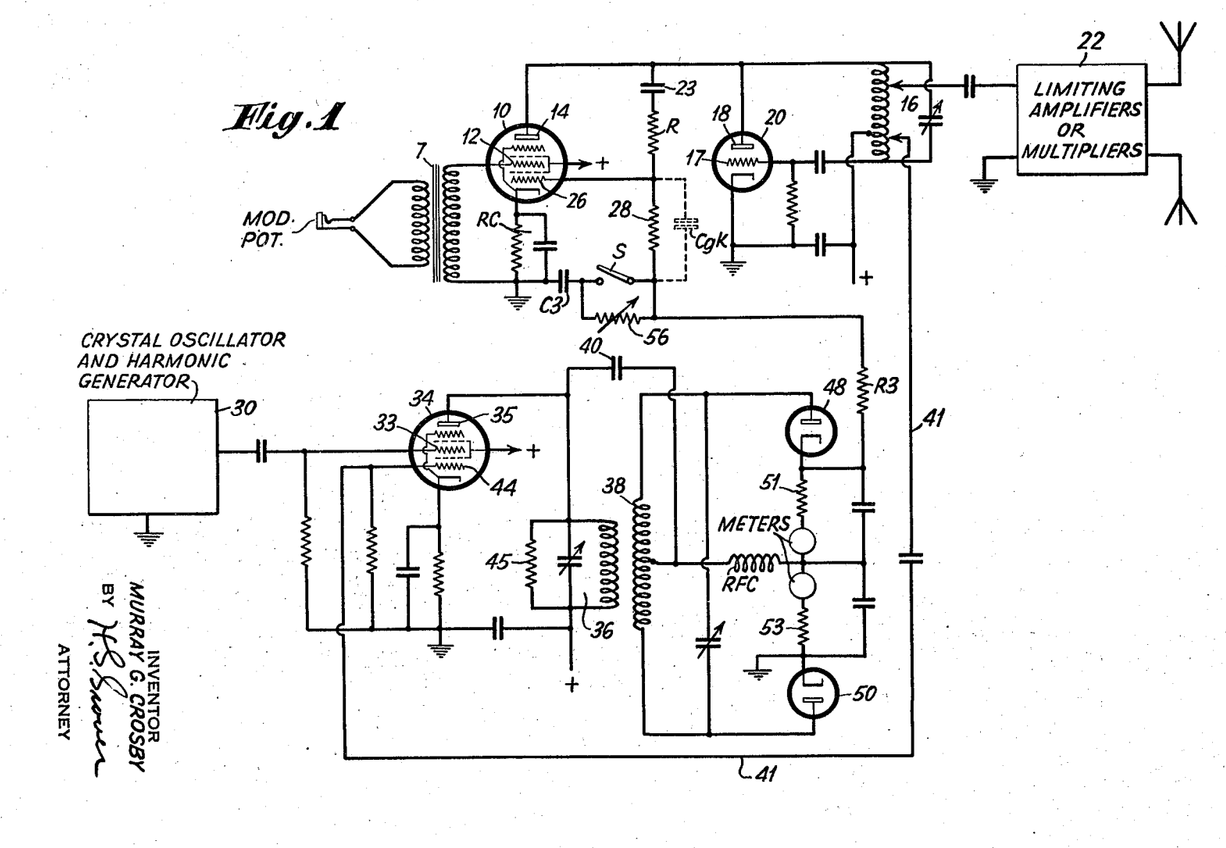
Figure 1 illustrates a frequency modulator comprising an oscillation generator connected at its output with utilizing means. The stability of the oscillation generator is controlled in an improved manner by a reactance tube supplied by control potentials from a discriminator circuit in turn connected with the oscillation generator and with a source of oscillations of substantially fixed frequency. The reactance tube also serves as a modulator by having one of its electrodes controlled by modulating potentials. A feature of this circuit is the means for supplying degeneration in controllable amounts to improve the quality of the modulation accomplished.

Referring to Figure 1, 10 is a reactance tube having a grid electrode 12 connected by transformer 7 to a source of modulating potentials. The reactance tube 10 has its anode 14 connected with the tuned circuit 16 regeneratively coupled between the grid 17 and anode 18 of an oscillation generator 20. The anode 18 of the oscillation generator 20 is also connected, as shown, to apparatus 22, in turn connected with utilizing means. The apparatus 22 may include limiters, amplifiers, and/or multipliers. The anode 14 of tube 10 is connected by a capacity 23 and resistance R to a control grid electrode 26 of tube 10 which electrode is connected by resistor 28 to the cathode of tube 10 by way of a condenser C3. Self-bias for the tube 10 is supplied by a cathode-return resistor and condenser unit RC. The coupling condenser 23 and resistance R, in combination with the capacity $C_{gk}$ shown dotted to represent the capacity between the grid 26 and the cathode of the tube 10, forms a phase shifting circuit which provides an alternating-current potential on the control grid 26 displaced in phase about 90 degrees with respect to the phase of the alternating-current potentials supplied to anode 14. If desired and necessary, the capacity $C_{gk}$ can be supplemented by a variable condenser.

Due to the phase quadrature relation between the voltages on the anode 14 and grid 26, a reactive effect is produced in the plate circuit of tube 10 in a manner well known in the art at the present time. This reactive effect is produced by amplifying the voltage fed to grid 26 through the phase shifter consisting of R and $C_{gk}$. In this phase shifter the elements are adjusted so that R has a high resistance compared to the reactance of $C_{gk}$. This causes the current through the phase shifter to be determined by the resistance so that the current is in phase with the applied voltage from the plate circuit. The drop across $C_{gk}$, therefore, lags the current fed to the phase shifter since the drop across a condenser lags the current through it (this relationship is more commonly spoken of as the current leading the voltage across the condenser). The tube thus amplifies a voltage which lags the applied voltage and a current is produced in the plate circuit which lags the applied voltage. Such a lagging current is equivalent to an inductance and, in this case, the inductance is variable by varying the amplification of the tube. When the amplification is increased the inductive current flowing in the plate circuit is increased and the equivalent shunt inductance is lowered. As the amplification is made lower, the inductance is increased. Hence, the variable reactance effect may be secured by varying an element voltage of the tube so that the amplification varies. In the case of Figure 1, the automatic frequency control potentials on grid 26 vary the reactive effect to hold the mean frequency constant while the potentials on grid 12 are varied in accordance with the signalling wave to vary the frequency in the same accordance.

Also, by controlling the potential on the grid 12 the reactance effect produced in the tube 10 can be varied. As a consequence, the frequency of the oscillations generated in tube 20 is modulated in accordance with the modulating potentials supplied at the transformer 7.

In order to stabilize the frequency of the oscillations generated at 20, I provide a source of oscillations of substantially constant frequency such as would be obtained by a crystal oscillator and a desired number of frequency multipliers in 30. These oscillations are supplied to the control grid of an amplifier 34 and alternating current is supplied from the anode 35 of the amplifier 34 to a tuned circuit 36. I also supply high frequency energy from the circuit 16 by way of lead 41 to the grid 44 of tube 34. Tube 34 acts as a converter, mixes oscillations supplied from 16 and 30 to produce an intermediate frequency which appears in the tuned circuit 36. The tuned circuit 36 is shunted by a damping resistance 45 to give it the desired band-pass characteristics. Oscillations of the intermediate frequency are induced in inductance 38 and also supplied directly to the mid-point of cathodes 38 by coupling condenser 40. This discriminator circuit, consequently, supplies phase-displaced and in-phase voltages to the diode rectifiers 48 and 50 to produce in the cathode resistors 51 and 53 thereof potentials characteristic of any deviations in the frequency of the oscillations supplied from tuned circuit 16 or source 30. That is, if, due to changes in temperature or any other causes, the frequency of the oscillations generated in 20 changes slowly or drifts, corresponding changes in potentials will appear across the resistor 51 and 53 differentially connected between the cathodes of the diode rectifiers 48 and 50. The resistor R3 connected with the cathode of diode rectifier 48 in combination with condenser C3 connected between the terminal resistor 28 and ground is a time constant circuit which is sufficiently slow to respond to slow variations only in the frequency of the oscillations supplied by 20. That is, the time constant here is made large so that the discriminator circuit comprising condenser 40 and inductances 36 and 38 and tubes 48 and 50 supply potentials characteristic only of drifts in frequency and do not respond to modulations of the frequency of the oscillations generated in 20.

As an example of the frequencies used, the circuit 16 may be tuned to 5 megacycles and, therefore, supplies oscillations of that frequency to the grid electrode 44. The output of the unit 30 may be at 4 megacycles so that the discriminator circuit including damped tuned circuit 36 may operate at an order of one megacycle. The discriminator circuit, including circuits 36 and 38 and condenser 40, is of a width due to the damping of resistance 45, equal to twice the frequency deviation covered by the oscillations produced by 20. For instance, if the output of the oscillator 20 is to be multiplied to 40 megacycles in the unit 22 for a maximum frequency deviation of 80 kilocycles, the maximum frequency deviation present at the frequency of 20 is 10 kilocycles so that the discriminator circuit has a characteristic substantially uniform over a band 20 kilocycles wide. In this example, it is assumed that the maximum modulation frequency is not greater than 10 kilocycles.

The output of the differential rectifiers 48 and 50 excited by voltages from the discriminator circuit may also be used for degeneration purposes and in doing so cooperate with the reactance tube 10. This is accomplished as illustrated in Figure 1 by including a variable resistance 56 in the circuit comprising condenser C3 and resistance R3 by opening the switch S.

This variable resistor 56, which may be removed from the circuit to remove the degeneration by closing switch S, allows modulating potentials to pass the time constant circuit R3, C3. Normally, this time constant circuit is adjusted so that the reactance of C3, for the modulating frequencies, is low compared to the resistance of R3. This prevents the passage of modulation frequency potentials which are converted from frequency modulation to amplitude modulation by discriminator 36, 40, 38, and detected by diodes 48 and 50. Slow frequency variations, which correspond to drifts of the mean frequency, are passed by R3, C3 so that a frequency correction is applied which holds the mean frequency constant. When it is desired to pass modulating frequencies through the time constant circuit, switch S may be opened so as to introduce an impedance in series with C3 which is not as low compared to R3 and, therefore, passes the fast variations which correspond to the signal modulations. This produces inverse feedback which tends to reduce the degree of frequency modulation and require additional potentials applied to grid 12 to produce the same degree of frequency modulation. However, this lowered sensitivity is compensated for by the fact that the well known advantages of inverse feedback are realized. These advantages include the improvement of the linearity of the system (or reduction of the harmonic distortion) and reduction of noises generated within the system such as hum and tube noises. The degree of this inverse feedback may be varied by varying the size of resistance 56 which is variable.

Figure 1A:
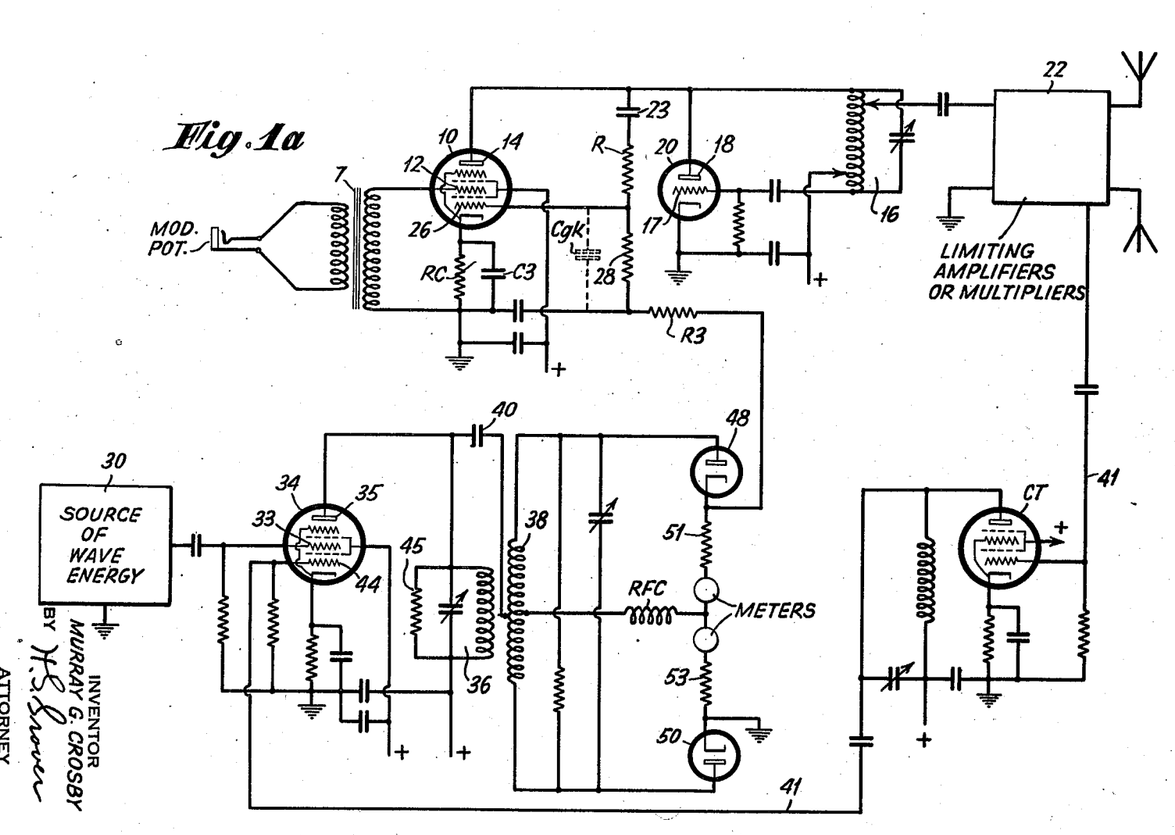
Figure 1a is a modification of the arrangement of Figure 1 and in Figure 1a the discriminator circuits instead of being supplied by wave energy from the oscillation generator are supplied by wave energy of a higher frequency from a frequency multiplier connected with the output of the modulated oscillator. The oscillations from the source of oscillations of fixed frequency are, in this case, higher in frequency than in the prior modification.

The modification shown in Figure 1a is similar in principle to the modification shown in Figure 1. In Figure 1a, however, the high-frequency wave energy impressed on the grid 44 is derived from the harmonic generator or frequency multiplier 22 instead of from the tuned circuit 16. In this case, the frequency of wave energy supplied from unit 30 will be higher. For example, voltages of 40 megacycles may be derived from the amplifiers and frequency multipliers in 22 and supplied to the grid 44. In this case, the output of 30 may be adjusted to 39 megacycles so that the discriminator circuit 36, 38, and 40 is again supplied with oscillations substantially of one megacycle. Of course, in Figures 1 and 1a, the discriminator circuit may operate at 450 or 300 kilocycles; that is, at a frequency lower than one megacycle. In this case, a corresponding adjustment is made in the output of either 22 or 30, preferably in the latter. In both of these modifications, care must be taken to isolate the output of the source 30 from lead 41 because of the fact that their frequencies are quite close together when the discriminator circuit is operated at 450 or 300 kilocycles and radiation of the output of 30 might take place. If desired, a coupling tube CT may be used in the lead 41 to uncouple the sources 30 and 22. Coupling tube CT shown in Figure 1a is of the screen-grid type which is properly shielded to act as a one-way repeater to convey the energy from unit 22 to grid 44 of tube 34. The well-known one-way properties of such a coupling tube act to prevent the transfer of energy from unit 30 to unit 22 and thereby prevent the radiation of the undesired energy from 30.

Figure 2:
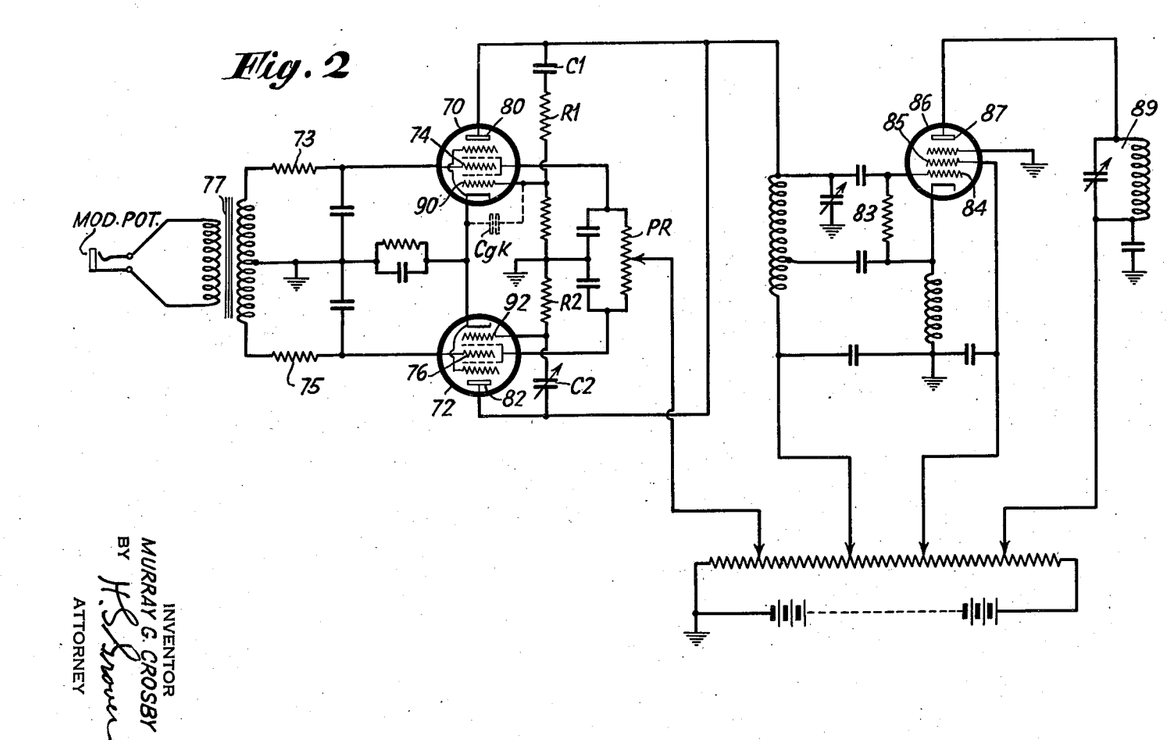

In Figure 2, I have shown a balanced reactance tube arrangement which stabilizes the oscillation generator to an extend such that it is not necessary to use the discriminator circuit principle provided in the prior figures to stabilize the mean frequency of the oscillations generated. In the arrangement of Figure 2, tubes 70 and 72, which are the balanced reactance tubes, have their grids 74 and 76 connected in phase opposition through resistance 73 and 75 to the secondary winding of a transformer 77. The tubes in this manner are excited in phase opposition by modulating potentials. The anode 80 of tube 70 and the anode 82 of tube 72 is connected to a point on the tuned regenerative circuit 83 connected between the control grid 84 and screen grid electrode 85 of an oscillation generator tube 86. This oscillator is of the electron-coupled type with its anode 87 electronically coupled to the oscillation generator electrodes and connected to tuned output circuit 89. The control grid 90 of tube 70 is connected to its anode by a phase shifting circuit including condenser Cgk and resistance R1 while the control grid 92 of tube 82 is connected to its anode by a phase shifting circuit R2—C2. The feedback phase shifter for tube 70 consisting of R1 and Cgk produces a phase shift which is primarily 180 degrees from that produced by the series capacitance C2 and shunt resistant R2, which feeds the voltages from tube 86 to the anode and grid of tube 72. This 180 degree phase difference causes tube 70 to produce a reactance change, which is opposite to that produced by 72, so that when the voltage on an electrode, such as, for example, the screen grid electrodes of tube 70 and 72 varies, the resultant reactive effects neutralize because the variations are in phase but opposite in character.

Tubes 70 and 72 of Figure 2 have their phase shifters R1, Cgk and R2, C2, arranged so that one tube amplifies a lagging voltage and, therefore, produces an inductive effect in its plate circuit (tube 70) and the other tube amplifies a leading voltage so as to produce a capacitive effect in its plate circuit (tube 72). As explained in connection with Figure 1, the phase shifter composed of R1 and Cgk is so adjusted that the current is determined by the resistance and is, therefore, in phase with the voltage applied to the phase shifter. The drop across condenser Cgk lags this current so that the tube amplifies a lagging voltage and, therefore, produces an inductive effect in the plate circuit. The tube may be looked upon as an amplifier which amplifies a lagging current so as to produce an amplified inductance. However, since it is the current of the inductance that is amplified, an increase in amplification produces a decrease in equivalent inductance.

The phase shifter of tube 72 is arranged so that the reactance of C2 is large compared to the resistance of R2 and the capacitive reactance, therefore, determines the current. This current will lead the voltage applied to the phase shifter so that the drop applied to grid 92 from resistor R2 will lead the applied voltage. The tube thus amplifies a leading voltage and, therefore, produces a capacitive reactive effect in its plate circuit. In this case, the capacitive current is also amplified so that an increase in amplification increases the effective capacity appearing in the plate circuit.

Since an increase in amplification decreases the effective inductance in the plate circuit of tube 70 and increases the effective capacity in the plate circuit of tube 72, it can be seen that if the amplification of both tubes vary in the same direction, the reactive effects tend to cancel. Likewise, it can be seen, that if differential modulation is applied such as to increase the amplification of one tube while decreasing that of the other, as will be the case with the modulating potentials applied by transformer 77, the reactive effects appearing in the plate circuits of both tubes will aid each other. I have found that by adjusting the screen voltage balancing potentiometer PR on the reactance tubes, it is possible to make the oscillator frequency independent of voltage variations from the common power source 95.

Since the modulating potentials are supplied from 77 in phase opposition, they produce changes in the same direction in the amounts of the reactances provided by the tubes which are in opposition. Thus, when the modulating potential on the grid of one tube increases, that on the grid of the other tube decreases. This causes the reactive effects produced by the tubes to change and being in parallel the total reactance supplied by the tubes to the tuned circuit 83 changes to change the frequency of the oscillations generated. The oscillator 86 is electron-coupled so that the frequency, without the reactance tubes connected, is relatively stable. In apparatus tested, an oscillator frequency of about 5 megacycles was produced at 86 and the modulator was found to be capable of a frequency deviation of about 100 kilocycles at 40 megacycles with good linearity. That is, the oscillator modulated in frequency, had its output supplied to frequency multipliers and stepped up to 40 megacycles at which frequency the frequency modulated output was linear.

Figure 2A:
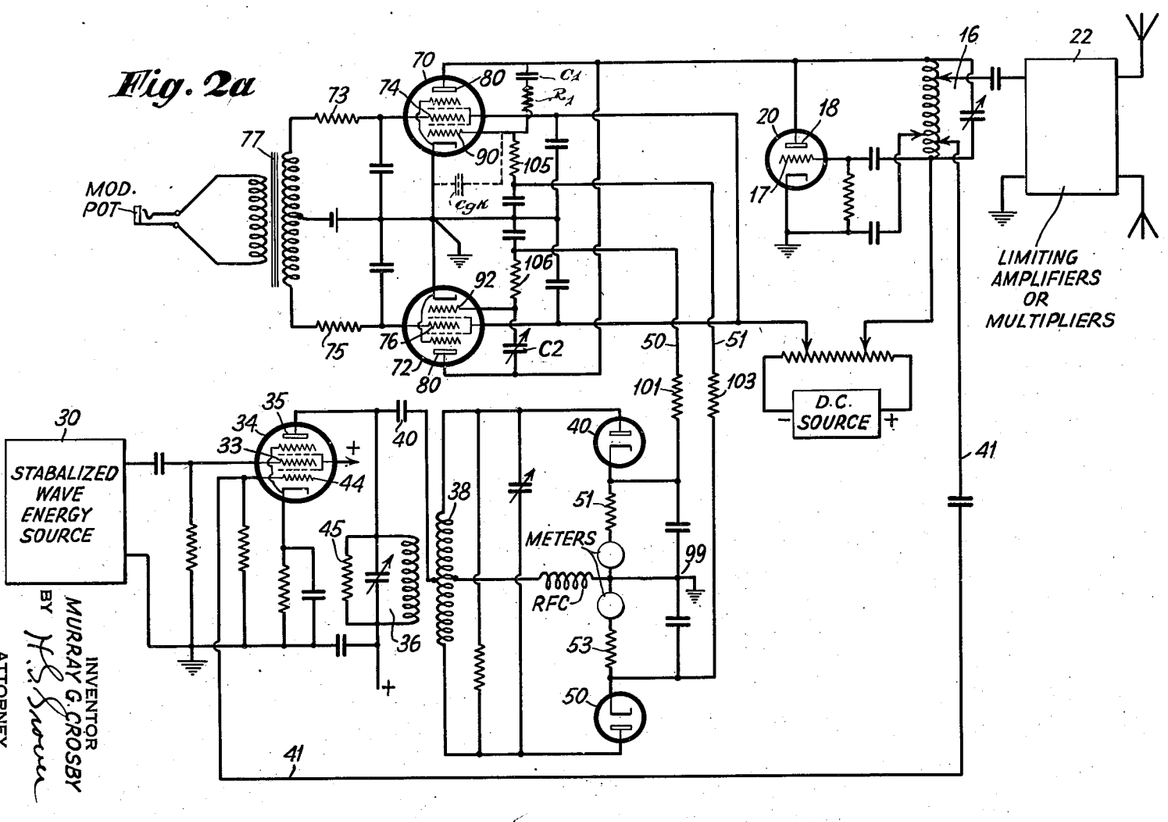
In Figure 2a, a pair of balanced reactance tubes replace the single reactance tube of Figure 1.

In the modification illustrated in Figure 2a, the balanced reactance tube modulator and stabilizer of Figure 2 replaces the single reactance tube modulator of Figure 1. This arrangement is accordingly similar to Figures 1 and 2 except for the following. In order to use the push-pull balanced modulator circuit wherein the tubes are symmetrical with respect to ground, the diode rectifiers are also balanced with respect to ground by connecting a point 99 between the cathodes to ground. The cathode resistors 51 and 53 now have their frequency potential ends connected through time constant resistances 101 and 103 to the ends of the resistors 105 and 106 which are, in turn, connected to the control electrodes 90 and 92.

The principle of operation of Figure 2a is the same as that of Fig. 1 except that the reactance tubes are balanced and, therefore, require a differential voltage for modulation and frequency control. The differential modulation is applied by the push-pull transformer to the second control grid in the same manner as in Figure 2. The differential frequency control potentials are obtained from the diodes by grounding the midpoint of the diode resistors as shown in Figure 2a.

When the frequency of oscillator 2 of Figure 2a drifts so that the currents in detectors 4 and 5 become off-balanced, the voltages across the diode resistors become out of balance. These out-of-balance voltages are fed through leads 50 and 51 to be applied as bias to the first control grids of the dual reactance tubes. An unbalance of these bias voltages causes a reactance to appear in the common plate circuits of the reactance tubes which cause the frequency of oscillator 2 to shift in frequency in a direction opposite to the drift. Of course, proper polarizing leads 50 and 51 are required in order to make the frequency correction oppose and not aid the drift.

Figure 3:
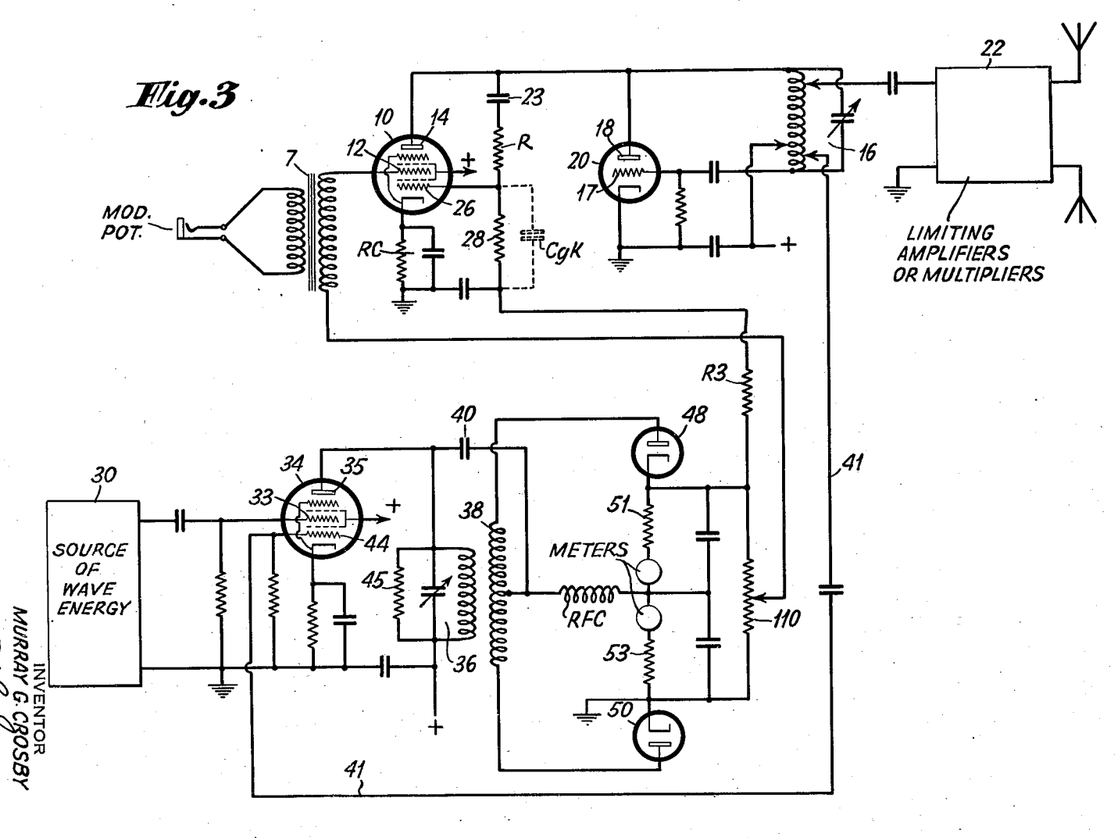

The modification of Figure 3 is similar to the modification in Figure 1 except that in Figure 3, I have provided means in the form of a potentiometer resistance 110 connected in shunt to the diode resistance 51 and 53 with a point on the potentiometer resistance 110 connected to the grid electrode 12 of the reactance tube 10. This provides a controllable amount of degeneration in the reactance tube 10 to thereby improve linearity of output of the modulator system. That is, potentials are fed from 110 to the control grid 12 in phase opposition to the modulating potentials therein and these modulating potentials, which correspond to the modulations on the wave energy in 16, produce an inverse feedback effect which tends to reduce non-linearities and noises generated within the tubes and other elements. As is well-known in the art of inverse feedback systems, this application of inverse feedback requires an increased input at 7 to produce the same degree of variable reactive effect, but this loss of sensitivity is amply compensated for by the decrease in distortion and noise.

The modulating potentials appearing on the diode resistors 51 and 53, which are fed to potentiometer 110 to produce the inverse feedback, are present by virtue of the frequency discriminator 36, 38, 40, and the detecting action of diodes 48 and 50. The discriminator is of the well-known type used for automatic frequency control purposes, but in this case is adjusted to linearly convert the frequency modulation into amplitude modulation for detection on the diodes. The detected output of the diodes, therefore, corresponds to the "envelope" of frequency modulations on the energy from 16. Thus, when this detected output is fed back to oppose the applied modulating potentials, inverse feedback is obtained with its accompanying advantages.

Any one of these circuits may be used for the transmission of phase modulation by inserting an audio correction network in the circuit of the modulating potentials fed to the modulators. This would be done in accordance with my United States Patent #2,085,739. This network would attenuate the lower modulation frequencies so as to make the amplitude of the modulating potentials proportional to their audio frequency. The second method of converting the circuits for phase modulation reception is by the use of a particular type of inverse feedback as is described in my United States application #136,578, filed April 13, 1937. In this method the AFC time constant (for instance R3, C3 in Figure 1) is so proportioned as to allow a high degree of inverse feedback for the lower modulation frequencies, but a progressively lesser amount as the modulation frequency is increased. This is done by decreasing either the value of C3 or R3. The resulting modulation then has the same characteristic it would have if the above mentioned audio correction network were applied to the modulating potentials.

What is claimed is:

1. In a wave length modulating system, an oscillation generator having a frequency-determining resonant circuit, a tube having a plurality of grids and a pair of electrodes connected with said resonant circuit to vary the effective value of one of the reactive components of said circuit in accordance with signal impulses impressed on one of said grids to produce wave length modulation of the generated oscillations, means for stabilizing the mean wave length of the oscillations including a tuned detector coupled to the resonant circuit and connected to another of said grids to react on the said tube to produce wave length modulation in such a direction as to counteract departures from the mean wave length, and means including said tuned detector for impressing a potential on an electrode of said tube which is a function of the modulation envelope of said modulated wave to improve the linearity of said wave length modulation.

2. A wave length modulation system comprising in combination, means for generating wave energy to be modulated comprising an electron discharge device including electrodes connected in oscillation generating circuits, and means for stabilizing the frequency of the wave generated and modulating the length of the wave generated by said oscillation generator including at least one reactance tube having an anode, a plurality of grid electrodes, and a cathode, means coupling said anode and cathode with said generating circuits to add the reactance provided thereby to said generating circuits, phase displacing means coupling a grid electrode of said reactance tube to said generating circuit, means connected with one of said grid electrodes for controlling the gain of said reactance tube at signal frequency to thereby modulate the length of the generated waves, and means for applying a potential to another of said grid electrodes characteristics of slow variations in the mean frequency of the wave generated and in a sense to oppose said slow changes to stabilize the mean wave length of the wave generated.

3. In a wave length modulation system, an oscillation generator including a resonant circuit for determining the wave length of the oscillations generated, a pair of electron discharge devices each having an output impedance connected in shunt to a portion of said resonant circuit, said electron discharge devices each having a plurality of electrodes, means including one of said electrodes of each of said devices for varying the tuned impedance of said circuit to vary the wave length of the oscillations generated in accordance with variations in the output impedances of said devices, means including another electrode of each of said devices for controlling the said output impedance devices in accordance with signals, and means including an electrode of each of said devices for controlling the said output impedances of said devices in response to slow departures of the wave length of the oscillations generated from the mean wave length thereof.

4. In a frequency modulation system, an oscillation generator including a resonant circuit for determining the frequency of the oscillations generated, a pair of electron discharge devices each having the impedance between two of its electrodes connected in shunt to a portion of said resonant circuit, said electron discharge devices having a plurality of control electrodes, means for impressing voltages from said generator in phase-displaced relation on a pair of electrodes in each of said devices for producing in said devices reactive effects of opposite sign and adding the same to said resonant circuit, to stabilize the frequency of the oscillations generated in the event of variations in the direct-current potential supplied to elements of said devices, means including another control electrode of each device for controlling the said reactive effects in phase opposition in accordance with signals, and means including another control electrode of each device for controlling said reactive effects of said devices in response to slow departures of the frequency of the oscillations generated from the mean frequency.

5. In a wave length modulation system, an oscillation generator including a resonant circuit for determining the frequency of the oscillations generated, an electron discharge device having an output impedance coupled in shunt to a portion of said resonant circuit, said electron discharge device having a control grid and an additional grid, means including said control grid for varying the tuned impedance of said circuit to vary the frequency of the oscillations generated in accordance with variations in the output impedance of said device, means including said additional grid electrode of said tube for controlling said output impedance of said device in accordance with signals to thereby modulate the wave length of the oscillation generator, means coupled with said control grid of said device for controlling the output impedance of said device in response to slow departures of the frequency of the oscillation generated from the normal frequency, and means coupled with said additional grid for varying the output impedance of said device as an inverse function of the modulation envelope of said wave length modulated oscillations.

6. In a wave length modulation system, an oscillation circuit wherein wave energy to be modulated flows, and means for modulating the length of said wave energy and for stabilizing the mean frequency of said wave energy including, at least one reactance tube having an electron receiving electrode, a plurality of electron flow control electrodes and a cathode, means coupling the impedance between said cathode and said electron receiving electrode of said tube with said oscillation circuit to add the reactance provided therebetween to said oscillation circuit, means coupling an electron flow control electrode of said reactance tube to said oscillation circuit, phase displacing means in one of said last named couplings to produce substantially a phase quadrature relation between voltages of the frequency of said wave energy on said electron receiving electrode and said last mentioned electron flow control electrode, means connected with one of said electron flow control electrodes for controlling the gain of said reactance tube at signal frequency to thereby modulate the length of the said wave energy and means for applying a potential to another of said electron flow control electrodes characteristic of undesired slow variations in the mean frequency of said wave energy and in a sense to oppose said slow variations to thereby stabilize the mean wave length of the wave generated.

7. In a wave length modulating system, wave generating means including an oscillation circuit having reactance which determines the frequency of the oscillations flowing therein, and means for modulating the length of the wave energy flowing in said oscillation circuit including at least one reactance tube having an electron emission electrode, an electron receiving electrode, and a plurality of electron flow control electrodes, means coupling the impedance between said electron receiving electrode and said electron emission electrode to the reactance of said circuit to supplement the reactance of said circuit, means coupling one of said electron flow control electrodes of said reactance tube to said oscillation circuit, phase displacing means in one of said couplings to produce substantially a phase quadrature relation between voltages of the frequency of said wave energy on said electron receiving electrode and last mentioned one electron flow control electrode, means connected with another of said electron flow control electrodes for controlling the gain of said reactance tube at modulation potential frequency to thereby modulate the length of the wave energy in said oscillation circuit, and means for applying a potential which is substantially an inverse copy of said modulation potentials to said one of said electron flow control electrodes to improve the linearity of said wave length modulation.

8. In a wave length modulation system, a circuit including reactance wherein wave energy is caused to flow, the frequency of which is determined in part by the reactance of said circuit, and means for stabilizing the mean frequency of the said wave energy and modulating the length thereof including, at least one reactance tube having an electrode serving as an anode, a cathode and a plurality of grid electrodes, means coupling said cathode to said circuit, means coupling said electrode serving as an anode to said circuit, means coupling one of said grids to said circuit, phase displacing means in said last two couplings whereby voltages of the frequency of said wave energy on said electrode serving as an anode and on said one of said grids are substantially in phase quadrature, means connected with another of said grids for controlling the gain of said reactance tube at modulation potential frequency to thereby modulate the length of the wave energy, means for applying a potential to said one of said grids characteristic of any undesired slow variations in the mean frequency of the wave energy and in a sense to oppose said slow changes to stabilize the mean wave length of the wave energy and means for impressing on said other of said grids potentials which are substantially an inverse copy of the modulation envelope of the said modulated wave to improve the linearity of said wave length modulation.

9. In a wave length modulation system, a circuit including reactance wherein wave energy is caused to flow, the frequency of which is determined in part by the reactance of said circuit, and means for stabilizing the frequency of said wave energy and modulating the length thereof including, at least one reactance tube having an electrode serving as an anode, a cathode and a plurality of grid electrodes, means coupling said cathode to said circuit, means coupling said electrode serving as an anode to said circuit, means coupling one of said grids to said circuit, phase displacing means in said last two couplings whereby the voltages on said electrode serving as an anode and on said one grid are substantially in phase quadrature, means connected with one of said grids for controlling the gain of said reactance tube at modulation potential frequency to thereby modulate the length of the wave energy, means for applying potentials to another of said grids characteristic of any slow variations in the mean frequency of the said wave energy and in a sense to oppose said slow changes to thereby stabilize the mean wave length of the wave energy and means for impressing on one of said grids potentials which are substantially an inverse copy of the modulation envelope of the said wave length modulated wave to improve the linearity of said wave length modulation.

10. In a wave length modulation system, an oscillation generator having a resonant circuit for determining the wave length of the oscillations generated, other circuits including a control tube for varying the resonant frequency of said resonant circuit at signal frequency to produce wave length modulation of the oscillations generated, other circuits including said control tube for counteracting slow variations of the wave length of the generated oscillations, and an additional circuit for degeneratively controlling the wave length modulation of the oscillations generated as a function of the modulated wave envelope.

11. In a wave length modulation system, a first circuit including a reactance wherein wave energy is caused to flow, a reactance tube coupled to said first circuit and controlled by signal potentials to vary the effective value of one of the reactive components of said first circuit in accordance with signal potentials to produce wave length modulation of wave energy flowing therein, circuit connections for stabilizing the mean wave length of the wave energy flowing in said first circuit including a tuned detector coupled to said first circuit and connected to the reactance tube to control the said reactance tube to produce wave length modulation of the wave energy flowing in said first circuit in such a direction as to counteract departures from the mean wave length thereof, and other circuit connections connected to said reactance tube for controlling the effective value of one of the reactive components of said first circuit in a degenerative sense to improve the linearity of said wave length modulation.

MURRAY G. CROSBY.